MAGNETIC REPRODUCING SYSTEM UTILIZING TWO OVERLAPPED HEADS TO CENTER ON ONE TRACK
Filed Dec. 24, 1962
3 Sheets-Sheet 1

INVENTORS
RAYMOND P. AUYANG
EDWARD J. WROBLEWSKI
BY Robert W. Berray
ATTORNEY

Dec. 20, 1966 R. P. AUYANG ETAL 3,293,627

MAGNETIC REPRODUCING SYSTEM UTILIZING TWO OVERLAPPED HEADS TO CENTER ON ONE TRACK

Filed Dec. 24, 1962 3 Sheets-Sheet 2

Dec. 20, 1966 R. P. AUYANG ETAL 3,293,627

MAGNETIC REPRODUCING SYSTEM UTILIZING TWO OVERLAPPED HEADS TO CENTER ON ONE TRACK

Filed Dec. 24, 1962 3 Sheets-Sheet 3

United States Patent Office 3,293,627

Patented Dec. 20, 1966

3,293,627

MAGNETIC REPRODUCING SYSTEM UTILIZING TWO OVERLAPPED HEADS TO CENTER ON ONE TRACK

Raymond P. Auyang, Poughkeepsie, and Edward J. Wroblewski, Millbrook, N.Y., assignors to International Business Machines Corporation, New York, N.Y., a corporation of New York Filed Dec. 24, 1962, Ser. No. 246,688
5 Claims. (Cl. 340—174.1)

This invention relates to a reproducing apparatus, and more particularly to a reproducing apparatus of the type wherein a series of longitudinally spaced transverse record tracks on a record tape are to be reproduced.

In attempting to magnetically record high frequency data, mechanical and space difficulties arose. Early attempts to record high frequency signals necessitated very high speed longitudinal movement of a record tape for recording in the normal longitudinal direction. The high speed operation is difficult to obtain without damaging the record tape and a large quantity of tape is required to record an entire record or message.

To alleviate the problems of high speed tape movement and the large quantity of tape required, systems were developed wherein the high frequency signals to be recorded were applied to recording heads moved at high speed across the width of the tape. High speed movement of the recording heads across the width of the tape is easy to obtain, and longitudinal movement of the tape could be held at a lower speed. Suitable control means would be provided to synchronize tape movement and recording head movement to record the high frequency information on transverse record tracks, successive tracks being spaced longitudinally along the record tape.

While high frequency recording was made possible by the transverse recording technique, other difficulties arose during the reproduction process. Mechanical differences between various tape units and adverse effects on the record tape itself resulted in distortion of the reproduced information. In some prior art systems, complicated electronic and mechanical control means are utilized during the recording and reproduction process to provide a closed loop servo system whereby head rotation and/or longitudinal tape movement can be continuously adjusted to compensate for speed differences between tape machines and/or dimensional changes in the record tape itself due to temperature and humidity.

Prior art longitudinally spaced transverse recording systems are not easily adapted for digital recording. Neither are these prior art devices adaptable for random access to a particular one or group of transverse record tracks for selective reproduction.

It is a principal object of this invention to provide a reproducing system for longitudinally spaced transverse record tracks on a record tape which is simple in construction, inexpensive to manufacture, and efficient.

Another object of this invention is to provide a reproducing system for longitudinally spaced transverse record tracks on a record tape which does not require the use of a closed loop servo system for continuously adjusting reproducing head rotation and/or longitudinal movement of the record tape.

A further object of this invention is to provide a reproducing system for longitudinally spaced transverse record tracks on a record tape wherein the longitudinal movement of the record tape is maintained at a constant speed while maintaining faithful reproduction of every transverse track irregardless of speed variations between various machines and/or dimensional changes in the record tape.

It is also an object of this invention to provide a reproducing system for longitudinally spaced transverse record tracks on a record tape wherein random access to a particular one or group of transverse record tracks can be achieved.

These and other objects, features and advantages of the present invention are obtained in a preferred embodiment thereof including a record tape having longitudinally spaced transverse record track portions, the track portions having a predetermined width, and a predetermined longitudinal spacing. Each record track has track defining indicia at one end of each of said tracks, including indicia distinguishing a particular transverse track from other transverse tracks. The system also includes drive means, and means controlled by the drive means for longitudinally moving the tape. Reproduction is achieved by providing first and second reproducing heads. The reproducing heads have transducing gaps with lengths equal to the longitudinal spacing of the transverse track portions. The first and second reproducing heads are mounted adjacent to each other in a direction normal to the gap lengths with the transducing gaps overlapped by an amount equal to one-half the longitudinal spacing of the transverse tracks. Means are provided for moving the reproducing heads across the record tape so that the overlapped portion of both of the reproducing heads cooperate with the same portion of the tape for reproducing information recorded on the tape. In response to reproduction of the track defining indicia at the leading end of each of the transverse tracks, selecting means are provided for indicating the position of the reproducing heads relative to a particular transverse track to be reproduced as indicated by track identifying means. By interpreting the signals from the two reproducing heads of the track defining indicia in relation to the track identifying means, either the output of the first or the second reproducing head is selected for transmission to an output device of the remainder of the recorded information on the identified transverse record track.

The foregoing and other objects, features and advantages of the invention will be apparent from the following more particular description of preferred embodiments of the invention, as illustrated in the accompanying drawings.

Figure 5:
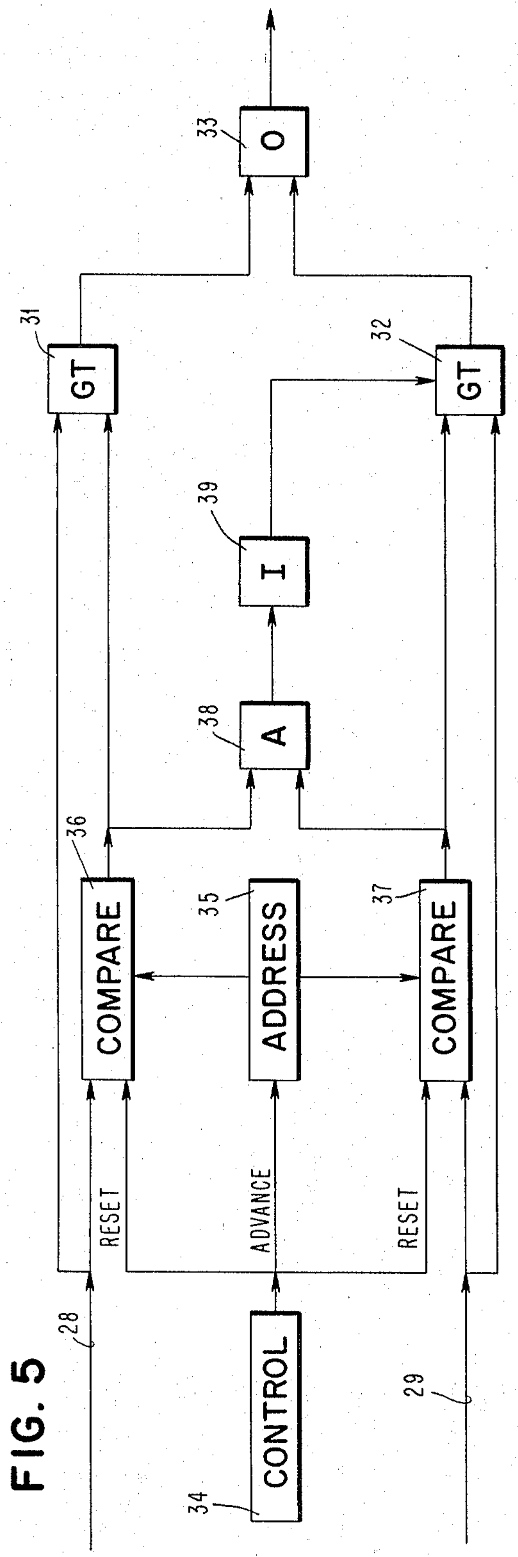
Figure 4:
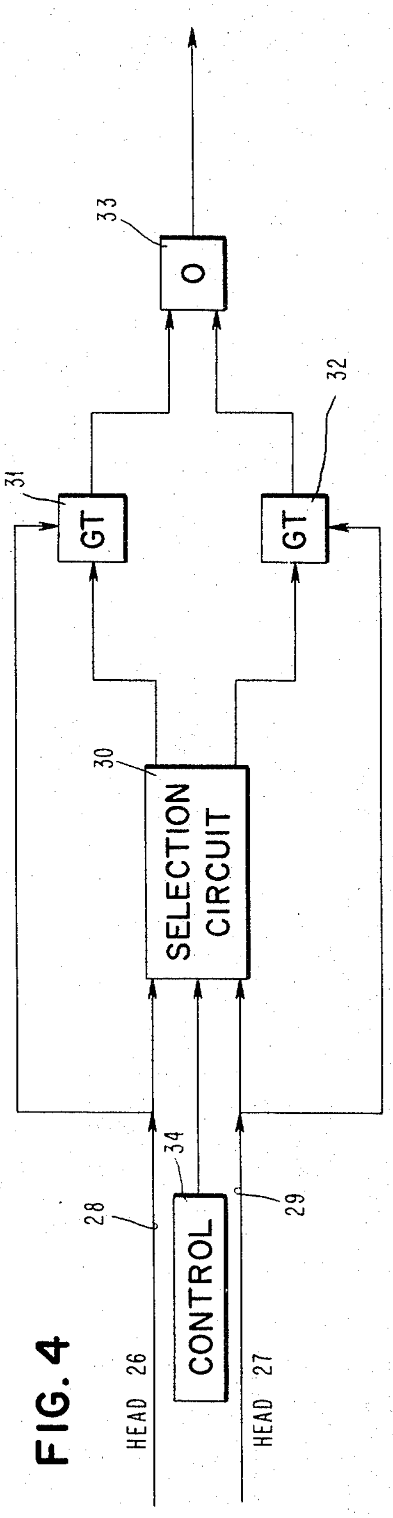
Figure 6:
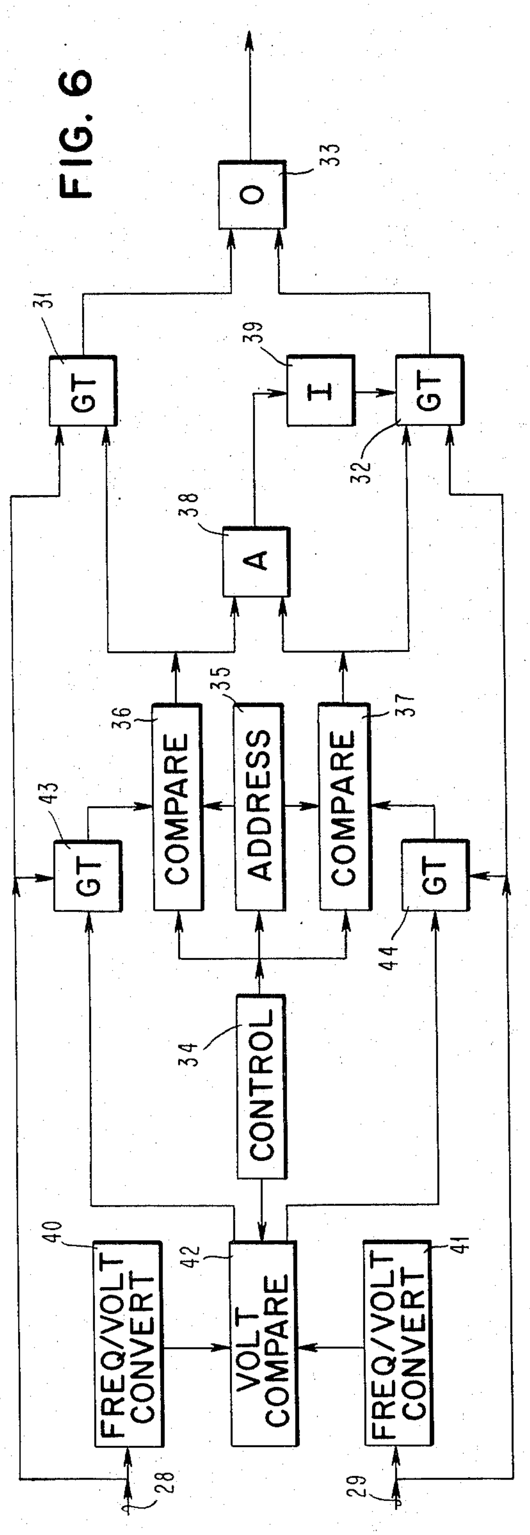
Figure 7:
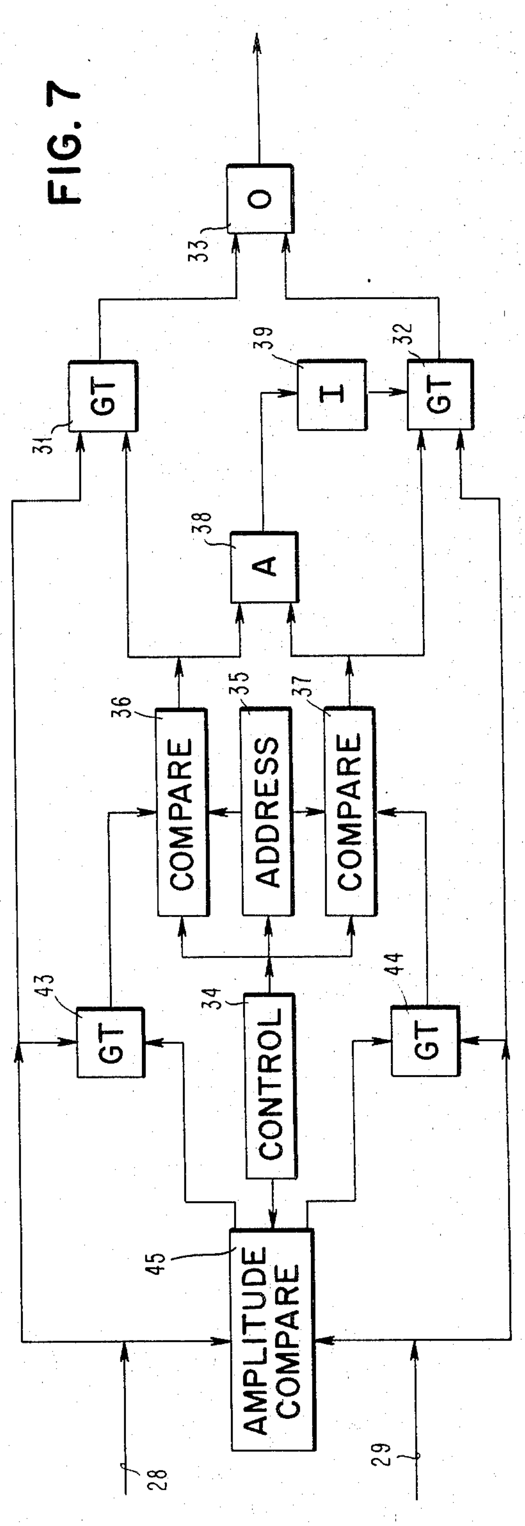

FIGURES 3*a* through 3*f* illustrate a fragmentary view of a record tape showing various positions of the reproducing heads relative to the longitudinally spaced transverse record tracks;

FIGURE 4 shows generally the logic required for selecting the output of one of the reproducing heads in response to vairous positions of the heads relative to a desired transverse record track;

FIGURE 5 shows logic in more detail than FIGURE 4 of one embodiment of the invention for selecting the output of one reproducing head to reproduce a desired transverse track;

FIGURE 6 shows logic in more detail than FIGURE 4 of another embodiment of the invention for selecting the output of one reproducing head for reproducing a particular transverse record track;

FIGURE 7 shows logic in more detail than FIGURE 4 of another embodiment of the invention for selecting the output of a particular one of the reproducing heads to reproduce an identified transverse record track.

Figure 1:
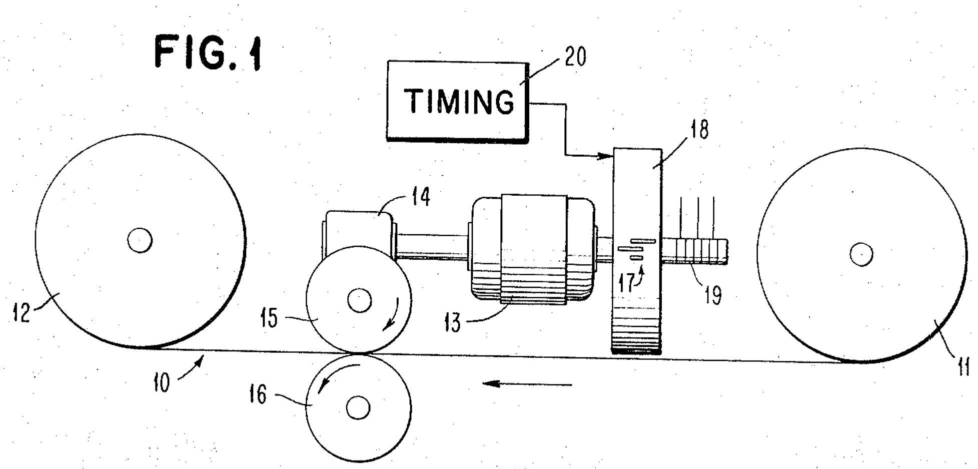
FIGURE 1 is a schematic view of a mechanism using a record tape for recording or reproducing longitudinally spaced transverse record tracks.

FIGURE 1 shows schematically the mechanism required of a recorder or reproducer utilizing the present invention. A record tape, noted generally by the numeral 10, is moved longitudinally from a supply reel 11 to a takeup reel 12 provided with suitable driving means not shown. A drive means 13, connected by suitable gearing 14, to a capstan 15 and pinch roller 16 produces longitudinal movement of the record tape 10. Recording and reproducing heads, noted generally by the numeral 17, are mounted on a drum 18. The drum 18 is rotated by the drive means 13 to cause the recording and reproducing heads 17 to move across the width of the record tape 10. The relative positions of the recording and reproducing heads 17 will be discussed in greater detail in connection with FIGURES 2 and 3. Suitable electrical connections are made to the recording and reproducing heads through slip rings 19. The position of the rotating heads 17 in relation to the record tape 10 can be noted by any suitable timing means 20. The information developed from the timing means 20 will be utilized to control when the recording head will record on the record tape 10. As discussed in greater detail, the information recorded on the record tape 10 includes a portion of the track containing track defining indicia and a portion of recorded data on the remainder of the transverse track.

A person skilled in the art will recognize that the head assembly 17 could also be mounted on a rotating disk which is rotated on an axis normal to the plane of the record tape 10 as distinguished from a drum 18 shown in FIGURE 1 rotating on an axis parallel to the plane of the record tape 10. Further, it will be recognized that the invention can be practiced in a system wherein the gearing 14 provides either incremental movement of the record tape 10 or continuous movement of the record tape 10. With continuous movement, the transverse tracks would be at a slight angle in relation to the width of the tape 10. While the invention is described in connection with one set of heads 17, by providing suitable controls along with the timing means 20, additional sets of recording and reproducing heads can be provided around the periphery of the drum 18.

Figure 2:
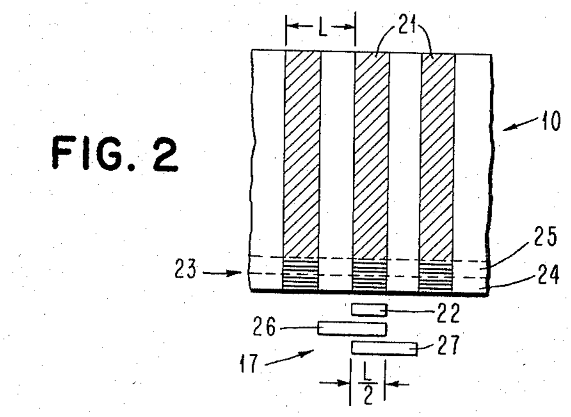
FIGURE 2 is a fragmentary view of a record tape showing relative dimensions of track widths, longitudinal spacing, recording head, and reproducing heads.

In FIGURE 2, there is shown a portion of the record tape 10 having a series of longitudinally spaced transverse record tracks 21. After recording, the record tracks 21 will have a predetermined longitudinal spacing L and a track width equal to one-half L.

The recording and reproducing head assembly 17 includes a recording head 22. During the recording of information, only recording head 22 will be operative. Recording head 22 has a transducing gap length equal to one-half L. Under control of the timing means 20 of FIGURE 1 and other suitable control means, recording head 22 records track defining indicia noted generally by the numeral 23 along a portion of each track 21. The track defining indicia 23 include, in a preferred embodiment of the invention, indicia 24 providing frequency and/or amplitude modulated signals and track defining indicia 25 providing an address for locating a particular one of the transverse tracks 21 on the record tape 10.

The recording and reproducing head assembly 17 also includes a first reproducing head 26 and a second reproducing head 27. The reproducing heads 26 and 27 have transducing gap lengths equal to the longitudinal tracks spacing L. The reproducing heads 26 and 27 are mounted adjacent to each other in a direction normal to the gap lengths in an overlapped relationship. During reproduction, reproducing heads 26 and 27 will move across the record tape 10 such that the overlapped portion of the reproducing heads will cooperate with the same portion of the record tape 10. The overlap of the reproducing heads 26 and 27 is equal to the transverse track width which is one-half the longitudinal spacing L.

Figures 3A, 3B, 3C, 3D, 3E, 3F:
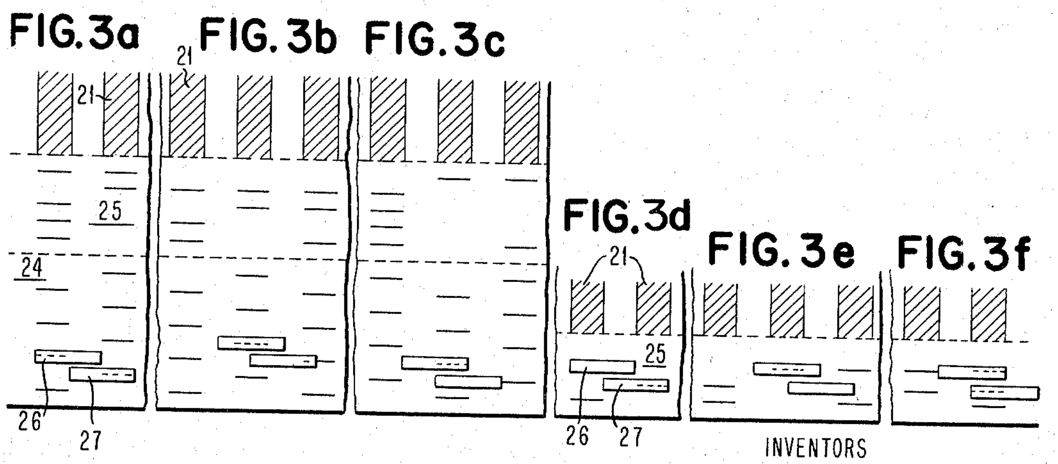

FIGURES 3*a* through 3*c* show fragmentary views of a record tape 10 depicting how reproducing heads 26 and 27 cooperate with the track defining indicia. The present invention is unique in that a complete disregard of fine positioning of the record tape 10 relative to the reproducing heads 26 and 27 does not prevent selective reproduction of a particular transverse track 21 or the sequential reproduction of several tracks.

In FIGURE 3*a*, transducer 26 is reading one track and transducer 27 is reading another track. A reading of the portion 25 of the track defining indicia, defining the track by an address, will determine whether the signals from head 26 or head 27 are selected. In FIGURE 3*b*, head 26 is reading only one set of track defining indicia but head 27 is reading a portion of track defining indicia for two adjacent tracks. Assuming the address portion 25 of the indicia read by transducer 26 is correct, the output of head 26 will be selected. In FIGURE 3*c*, heads 26 and 27 are reading the same track defining indicia from only one track. Assuming the address portion 25 of the track defining indicia reproduced by the heads is for the particular track to be reproduced, a selection is made of the signals from only a particular one of the heads 26 or 27.

FIGURES 3*d* through 3*f* show fragments of the record tape 10 utilized with a head selection embodiment wherein the track defining indicia only includes the address indicia 25. The relative positions of the heads 26 and 27 are the same as previously discussed showing that at least one of the reproducing heads 26 and 27 is reproducing indicia from only one of the transverse record tracks 21.

FIGURE 4 shows the general logic required for selecting the signals from either head 26 or head 27 depending upon which of the heads is reproducing track defining indicia from the desired transverse track. The signals reproduced from the track defining indicia by heads 26 and 27 are applied to a selection circuit 30 over lines 28 and 29 respectively. The signals from head 26 are applied to a gate 31 and the signals from head 27 are applied to a gate 32. The outputs of gates 31 and 32 are applied to an OR circuit 33 which provides the reproduced recorded data from the reproduced track to an output device. Selection circuit 30 will provide the necessary gating input to either gate 31 or gate 32 once it has been determined which of the heads 26 or 27 is producing signals from a desired transverse track. Suitable control means 34 is provided, under control in the first instance by the timing means 20 of FIGURE 1, to reset the selection circuit 30 prior to reproducing the track defining indicia from the next sequential record track to be reproduced.

In one embodiment of the invention, the selection circuit 30 of FIGURE 4 takes the form of the logic shown in FIGURE 5. The logic of FIGURE 5 would be utilized in combination with track defining indicia represented by FIGURES 3*d* through 3*f*. In this situation, the track defining indicia 25 only takes the form of track address information. The particular one of the transverse tracks to be reproduced is identified by inserting the transverse track address in an address register 35. This may be the address of the first track of a record tape or it may be the address of any other transverse track on the record tape 10. The address information from each of the reproducing heads 26 and 27 is applied to address comparing means 36 and 37 respectively.

If reproducing heads 26 and 27 are in the position shown in FIGURE 3*d*, either head 26 or head 27 will be reproducing the track defining indicia 25 indicated by the address in address register 35. Either compare device 36 or compare device 37 will show a comparison, but not both, such that either gate 31 or gate 32 will be enabled to pass the reproduced signals from the remainder of the identified track to the output device.

In FIGURE 3*e*, only reproducing head 26 will provide a proper reproduced address, such that compare device 36 will provide the only compare indication with the address 35 such that gate 31 will be enabled to pass the remainder of the reproduced signals to the output device.

In FIGURE 3*f*, both heads 26 and 27 are reproducing the track defining indicia from the same track. Assuming that the address reproduced by the heads 26 and 27 is the address contained in register 35 of FIGURE 5, both compare devices 36 and 37 will provide a gating signal to gates 31 and 32 respectively. A function of the selecting circuit is to inhibit operation of gate 32 whenever both of the heads 26 and 27 show a compare. If this were not done, erroneous output signals would be produced. An AND circuit 38 and an inverter 39 indicate when both of the heads 26 and 27 show a compare such that gate 32 will be deconditioned by the inverter 39 to allow only the signals from head 26 to be gated by gate 31 to the output.

The control device 34 will be effective under control of the timing means 20 of FIGURE 1, to reset the comparing devices 36 and 37 and to advance the address register 35 preparing the selection circuit for reproduction of the track defining indicia of the next sequential track.

In a preferred embodiment of the invention, additional reliability is achieved by making a preselection of either head 26 or head 27 for reading the address portion 25 of the track defining indicia. The address portion 25 of the track defining indicia will be selected from either head 26 or head 27 dependent upon whether or not the particular head is reproducing track defining indicia 24 from only one of the tracks. If a particular one of the heads 26 or 27 is reproducing track defining indicia 24 from more than one of the transverse tracks, means will be provided for inhibiting the application of the address indicia 25 to the comparing devices 36 or 37.

The preferred form of the track defining indicia to be utilized with the preferred form of the selection circuit shown in FIGURE 6 is shown in FIGURES 3*a* through 3*c*. The portion 24 of the track defining indicia is made up of regularly occurring indicia in the direction of the transverse track 21. The regularly occurring indicia of adjacent tracks are displaced in the direction of the transverse tracks. The relative position of the heads 26 and 27 can therefore be determined by the frequency of the signals reproduced from the regularly occurring indicia 24. In FIGURE 3*a*, heads 26 and 27 will be producing signals from the regularly occurring indicia at a unit frequency. In FIGURE 3*b*, however, transducer 26 will be producing signals having the unit frequency but head 27 will be providing output signals caused by indicia from two adjacent tracks. The frequency of these output signals from head 27 will be twice as great as the unit frequency. The preselection portion of FIGURE 6 makes a determination during the time the heads 26 and 27 are in the track defining indicia portion 24 to eliminate the signals of the address indicia 25 from a particular one of the heads 26 or 27 which is reproducing indicia from two adjacent tracks.

The signals from heads 26 and 27 are applied to frequency to voltage converters 40 and 41 respectively. The voltages generated by frequency to voltage converters 40 and 41 are applied to a voltage compare device 42. The voltage produced by signals having the unit frequency will have a particular value and the signals having twice the unit frequency will have another value. The value of these voltages is compared in voltage compare device 42 with a standard equal to the voltage produced by the unit frequency signals. Gate 43 or gate 44 will be enabled only if the frequency of the signals reproduced by the associated reproducing head is at the unit frequency indicating that the associated reproducing head is reading only one track of information.

Once this preselection has been made by gates 43 and 44, the remainder of the operation is the same as discussed in connection with FIGURE 5. If the associated reproducing head is producing unit frequency signals, gates 43 and 44 will be enabled to pass the portion 25 of the track defining indicia containing the address information to the compare devices 36 and 37. In FIGURE 3*b*, reproducing head 27 is reproducing indicia from two adjacent tracks so that the output of frequency to voltage converter 41 applied to voltage comparator 42 will indicate that the address information to be read by transducer 27 would be unreliable such that gate 44 is not enabled to pass address information to compare device 37. The control device 34 in FIGURE 6 is not only utilized to advance the address in the register 35 and to reset the comparators 36 and 37, but is also utilized to reset the voltage compare device 42 prior to making a preselection from the next sequential transverse track.

FIGURE 7 shows another embodiment of the selection circuit 30 of FIGURE 4 which operates much the same as the circuitry in FIGURE 6. While amplitude information is not as reliable as frequency information, a preselection to eliminate address information from a reproducing head can be made by comparing the amplitude of the signals being read by the reproducing heads 26 and 27. The amplitude of the reproduced signals can be compared with a standard amplitude voltage or the amplitude of the signals from the two reproducing heads can be compared to select signals from only the reproducing head reading the greatest amplitude signal. This amplitude or voltage comparing is done in suitable logic of FIGURE 7 labeled amplitude compare 45. Again referring to FIGURE 3*b*, the address portion 25 of the track defining indicia would not be applied to compare device 37 through gate 44 because the amplitude of the signals being read by reproducing head 27 would not be as great as the signals being read by reproducing head 26. Nor would the amplitude of the signals being read by reproducing head 27 be as great as a standard voltage set in accordance with the maximum amplitude signal which can be read when a transducer is reading a single track's defining indicia.

Since precise speed control is usually impossible and deformation of the record medium is likely, proper operation of the invention is achieved by insuring that the longitudinal advance of the record medium 10 is slightly less than the longitudinal track spacing L for each revolution of the reproducing heads 26 and 27. With the longitudinal movement of the tape 10 being less than the track spacing L, a point will be reached in the operation of the device where a particular one of the transverse tracks will be in cooperative relationship with the reproducing heads 26 and 27 during two revolutions of the reproducing heads. Duplicate reproduction of the same transverse track will not occur since neither of the heads 26 or 27 will reproduce address information which will compare with the address of the next sequential track to be read. Longitudinal movement of the record 10 a distance more than the track spacing L should not be allowed because a particular one of the transverse tracks could be skipped without reproduction.

Random access to a particular transverse track can easily be achieved by slight additions to the logic shown. A desired address can be placed in the address register 35 and compared with the address being reproduced by the heads 26 or 27. The difference in the address being read and the address desired can be utilized to provide necessary controls to rapidly advance the record tape 10 a period of time or number of revolutions proportional to the address difference. After the rapid advance, normal advance is resumed so that reproducing head selection can be accomplished when the desired transverse track address is reproduced.

There has thus been shown a reproducing system for longitudinally spaced transverse records on a record tape wherein mechanical movement is maintained at a constant value. Reproduction of the transverse tracks is accomplished merely by electronic selection of one of two reproducing heads. Precise and fine adjustment of record advancement is not required. Further, the reproducing system disclosed in the present invention is readily adapted to random access reproduction in a transverse track recording system.

While the invention has been particularly shown and described with reference to preferred embodiments thereof, it will be understood by those skilled in the art that the foregoing and other changes in form and details may be made therein without departing from the spirit and scope of the invention.

What is claimed:

1. In a system for reproducing from a record tape having longitudinally spaced transverse record track portions, said track portions having a predetermined width, a predetermined longitudinal track centerline spacing, and recorded track defining indicia at one end of each of said tracks, the system including drive means, and means controlled by said drive means for longitudinally moving said tape, comprising in combination:

first and second reproducing heads;

means controlled by the drive means adapted to mount said heads adjacent to each other in an overlapped position for movement across the tape such that a portion of both said heads cooperate with the same track portion on the tape for reproducing information recorded thereon;

and means responsive to signals of reproduced track defining indicia by both of said heads for selecting the signals from a particular one of said first or second reproducing heads for reproducing the remainder of a particular one of the transverse record tracks.

2. In a system for reproducing from a record tape having longitudinally spaced transverse record track portions, said track portions having a predetermined width, a predetermined longitudinal track centerline spacing equal to twice the track width, and recorded track defining indicia at one end of each of said tracks, the system including drive means, and means controlled by said drive means for longitudinally moving said tape, comprising in combination:

first and second reproducing heads having transducing gap lengths equal to the longitudinal spacing of the track portions;

means adapted to mount said heads adjacent to each other in a direction normal to the gap lengths with the transducing gaps overlapped by an amount equal to one-half the longitudinal spacing of the track portions;

means controlled by the drive means and synchronized with the tape moving means for moving said reproducing heads across the tape such that the overlapped portion of both said heads cooperate with the same portion of the tape for reproducing information recorded thereon;

and selecting means, responsive to signals from both of said heads of reproduced track defining indicia, for selecting the signals from a particular one of said first or second heads for reproducing the remainder of a particular one of the transverse record tracks.

3. A reproducing system in accordance with claim 2 wherein said selecting means includes:

means identifying a particular one of the transverse tracks to be reproduced;

and means, including comparing means, responsive to said track identifying means and the signals from both of said reproducing heads of the reproduced track defining indicia, for selecting the signals from only said reproducing head that is reproducing track defining indicia from only said identified track for reproducing the remainder of said identified record track.

4. A reproducing system in accordance with claim 3 wherein said selecting means further includes:

gating means associated with each of said heads for applying the signals of the reproduced track defining indicia to said comparing means;

and means responsive to signals from both of said heads of reproduced track defining indicia, for enabling said associated gating means only when said associated head is reproducing track defining indicia from only one record track.

5. A reproducing system in accordance with claim 4 wherein said selecting means further includes:

means, responsive to said comparing means, for inhibiting selection of reproduced signals from a particular one of said heads when both of said heads are reproducing only the track defining indicia of said identified track.

References Cited by the Examiner

Tsilibes, "Transducer Position Sensor," IBM Technical Disclosure Bulletin, vol. 4, No. 5, October 1961.

BERNARD KONICK, *Primary Examiner.*

A. I. NEUSTADT, *Assistant Examiner.*